United States Patent
Hughes et al.

(10) Patent No.: US 9,117,502 B2
(45) Date of Patent: Aug. 25, 2015

(54) SYSTEM AND METHOD FOR MEMORY MANAGEMENT OF UNIQUE ALPHA-NUMERIC ORDER IDENTIFIERS SUBJECTED TO HASHING AND TRUNCATION FOR MAPPING TO LIMITED MEMORY SPACE

(71) Applicant: Fixnetix, LTD., London (GB)

(72) Inventors: Hugh Hughes, London (GB); Paul Ellis, Trowbridge (GB); Alasdair Moore, Wimbledon (GB); Marcus Perrett, London (GB)

(73) Assignee: FIXNETIX LTD., London (GB)

( * ) Notice: Subject to any disclaimer, the term of this patent is extended or adjusted under 35 U.S.C. 154(b) by 297 days.

(21) Appl. No.: 13/761,134

(22) Filed: Feb. 6, 2013

(65) Prior Publication Data

US 2014/0223091 A1   Aug. 7, 2014

(51) Int. Cl.
*G11C 7/10* (2006.01)
*G06F 17/30* (2006.01)
*H04L 12/743* (2013.01)
*G06Q 40/08* (2012.01)

(52) U.S. Cl.
CPC .......... *G11C 7/1072* (2013.01); *G06F 17/3033* (2013.01); *G06F 17/30949* (2013.01); *H04L 45/7453* (2013.01); *G06Q 40/08* (2013.01)

(58) Field of Classification Search
CPC .......... G06F 17/30949; G06F 17/3033; G06Q 40/08; H04L 45/7453
USPC .......... 707/749, 756; 370/392; 711/170, 210, 711/216
See application file for complete search history.

(56) References Cited

U.S. PATENT DOCUMENTS

| | | | |
|---|---|---|---|
| 5,848,423 A * | 12/1998 | Ebrahim et al. ...... | 1/1 |
| 5,852,607 A | 12/1998 | Chin | |
| 5,911,144 A * | 6/1999 | Schwartz et al. ...... | 1/1 |
| 5,914,938 A | 6/1999 | Brady et al. | |
| 6,038,572 A * | 3/2000 | Schwartz et al. ...... | 1/1 |
| 6,292,483 B1 | 9/2001 | Kerstein | |
| 6,892,176 B2 * | 5/2005 | Stoimenov et al. ...... | 704/255 |
| 6,934,796 B1 | 8/2005 | Pereira et al. | |
| 7,234,021 B1 * | 6/2007 | Chilton ......... | 711/113 |
| 7,526,607 B1 | 4/2009 | Singh et al. | |
| 7,664,731 B2 * | 2/2010 | Snapp et al. ...... | 707/747 |
| 8,184,953 B1 | 5/2012 | Covell et al. | |
| 8,909,606 B2 * | 12/2014 | Pollack ......... | 707/682 |
| 2004/0125799 A1 | 7/2004 | Buer | |
| 2006/0271539 A1 * | 11/2006 | Loeb ............. | 707/7 |
| 2007/0244850 A1 * | 10/2007 | Hoppe et al. ...... | 707/2 |
| 2010/0257176 A1 * | 10/2010 | Lu ............... | 707/741 |
| 2011/0010347 A1 * | 1/2011 | Cheriton et al. ...... | 707/692 |
| 2011/0128960 A1 | 6/2011 | Bando et al. | |

(Continued)

OTHER PUBLICATIONS

PCT International Search Report of PCT/US14/14961; dated May 5, 2014.

(Continued)

*Primary Examiner* — Hong Kim
(74) *Attorney, Agent, or Firm* — DLA Piper LLP (US)

(57) ABSTRACT

An embedded hardware-based risk system is provided that has an apparatus and method for the management of unique alpha-numeric order message identifiers within DDR memory space restrictions. The apparatus provides a new design for assigning orders (CLOrID) to memory and the method thereof specifically with the intention to not impact latency until memory is over 90% full.

34 Claims, 11 Drawing Sheets

(56) References Cited

U.S. PATENT DOCUMENTS

2012/0102009 A1     4/2012   Peterson et al.
2012/0130884 A1*   5/2012   Ellis et al. ................. 705/37
2013/0311492 A1*   11/2013   Calvignac et al. ............ 707/756

OTHER PUBLICATIONS

PCT Written Opinion of the International Searching Authority of PCT/US14/14961; dated May 5, 2014.

* cited by examiner

Order A:

Original Alpha Numeric ID: abc123456789

Transformed Numerical Value: 4563213331112727

Truncated Duplicate (Hash Collision): #112727

Order B:

Original Alpha Numeric ID: xyzaa3456789

Transformed Numerical Value: 2564152411112727

Truncated Duplicate (Hash Collision): #112727

Memory Divisions Table

| Memory Divisions | | Memory Size |
|---|---|---|
| 1Gb Memory Space | equals | 1,073,741,824Bytes |
| 1Bin | equals | 4096Bytes |
| 1 Bin Off-Set | equals | 256Bytes |

Memory Relationships Table

| Memory Relationships | | Memory Size |
|---|---|---|
| 1Gb Memory Space | Contains | 262,144 Bins |
| 1Bin | Contains | 16 Bin Off-Sets |
| 1Bin | Equals | 1 Order ID |
| 1 Bin Off-Set | Contains | 1 Order |

FIGURE 8

SYSTEM AND METHOD FOR MEMORY MANAGEMENT OF UNIQUE ALPHA-NUMERIC ORDER IDENTIFIERS SUBJECTED TO HASHING AND TRUNCATION FOR MAPPING TO LIMITED MEMORY SPACE

FIELD

The disclosure relates generally to a system and method for assigning unique alpha-numeric order message identifiers into memory and in particular to a system and method for assigning unique alpha-numeric order message identifiers into memory as part of an embedded hardware trade risk system.

BACKGROUND

There are currently various embedded hardware systems that are commercially available to financial market participants and their clients which provide a combination of both pre trade and post trade risk assessments, real-time market data and trading connectivity to numerous liquidity venues listing financial instruments. The financial instruments may include securities, options, futures, commodities and foreign exchange. These current systems provide financial market trading participants with the fastest available electronic market data and trading connectivity to liquidity venues. The current systems also provide intra-day trading risk assessments for both the financial market trading participant and the electronically connected trading clients of the financial market trading participant.

At present the most common type of embedded hardware used for such risk systems are User Programmable Hardware Chips (UPHCs) such as Field Programmable Gate Arrays (FPGA), Programmable Object Arrays (FPOA) or an Application-Specific Integrated Circuit (ASIC) microchips.

As part of the risk function, current embedded hardware risk systems are required to manage multiple messages in which each message contains a Client Order Identifier (CLOrID) that can be up to 64 Bytes in length (depending upon the message protocol). These message protocols include Financial Information Exchange Protocol (FIX), OUCH and other industry standard formats as operated by both liquidity venues and trading participants.

The use of these standard message protocols with CLOrID message lengths of up to 64 Bytes causes two problems within a UPHC. Firstly, to use this CLOrID value as a unique memory location requires a memory space far larger than that accessible by a UPHC. Essentially, a UPHC does not hold enough memory space for the whole CLOrID to be mapped in its entirety as it would require a memory location size of $2^{64}$ Bytes for each CLOrID to be written to memory. Secondly, the ClOrID is made up of alpha-numeric characters which do not map to a numerical address memory space as typically found in UPHCs.

To date, these two problems have been resolved by a traditional two stage procedure known as 'hashing'. In the hashing process, the alpha-numeric CLOrID is transformed into a numerical only value which can then be stored by the UPHC in memory. In addition, the numerical CLOrID is also truncated/shortened so that the resulting value can be sized to fit in the available memory address space within the UPHC.

However, while the traditional hashing procedure does resolve the initial issues of ClOrID message length and Alpha Numeric message incompatibility, it is unfortunately not without weakness as a solution. Specifically, the process of converting the CLOrID to a Numerical value (which is then subsequently truncated), can lead to a problem known as a 'hash collision'. A hash collision can occur when two original CLOrIDs (that are originally different) are mapped to a common address value due to the process of truncation. Essentially, truncation of the newly formed numeric CLOrID can mean (in times of high message throughput and memory use) that the CLOrID is no longer unique because the value has been truncated to a smaller value that might already be in use. For example, as shown in FIG. 1, two different orders (order A and order B) with two unique original CLOrIDs are transformed into a numeric value which is then truncated which result in the hash collision since the truncated identifiers are not unique even though the original CLOrIDs were unique.

Traditionally, such hash collisions have been managed by incrementing the second memory address until a free memory location is identified as shown in FIG. 3 via a process known as linear searching.

Statistically, as more orders are hashed and stored due to greater trading throughput, the likelihood of a hash collision becomes greater. This is especially prevalent when the system is dealing with thousands of concurrent orders. Additionally, due to the volume of concurrent orders being managed in memory, the likelihood of an adjacent memory location being free in the event of a hash collision is reduced so that the above traditional linear searching does not work very well. This in turn leads to a forth problem affecting overall system latency.

As previously described, when a hash collision occurs, the system must increment the second truncated CLOrID memory address until it can find an empty memory location via a linear search as shown in FIG. 3. However, if the next available memory space is not adjacent to the existing hash collision memory location, the system is required to search through possibly the entire memory space range for an available memory location.

In such circumstances it is not unusual for between 10 to 20 increments of memory space location linear searches to be required before a free location is found. The number of simultaneous linear search cycles taking place can cause a memory access latency penalty when the memory usage approaches more than 50% of capacity. The memory access penalty to each linear search results in a non-deterministic latency performance affecting all messages within the UPHC. Accordingly, given that the UPHC's primary function is to provide risk calculations in the lowest time possible in order to improve trading performance, the effect of any increase in system latency due to memory utilisation issues is harmful.

In system tests in which each memory entry CLOrID was stored in 256 Bytes of memory, the system was utilising 1 Gb of RAM and with the UPHC system employing a traditional hashing & Linear Search methodology, it was observed that after about 2000 orders, hash collisions began to occur and that after about 5000 orders, the linear searching method impacted overall UPHC latency.

In the tests, latency was calculated on the basis that the UPHC would typically take 1 µs (microsecond) to process a 'Single Order Message' and that the SDRAM housed within the UPHC card would take 185 ns (nanoseconds) to perform a linear search. Accordingly, the increase in latency for each new order was calculated as follows:

$$1 \text{ µs} + (\text{No of linear searches} \times 185 \text{ ns})$$

As each order was entered into the system, the latency was measured to determine the amount of time that the order took to be written to memory. Any increase in latency as more orders were entered into the system would be directly attributable to the amount of hash collisions occurring and the amount of subsequent linear searches taking place a result.

The results demonstrated that the current hashing and linear search memory mechanisms in use within current UPHC risk platforms result in a maximum throughput of concurrent order messages of approximately 5000 before the systems become unfit for its intended purpose. For most organisations employing such UPHC devices to perform their risk analysis, an order throughput rate of 5000 concurrent orders is far below the minimum requirement.

Consequently, it is desirable to provide an embedded hardware based risk system with a new design and method for the management of unique alpha-numeric order message identifiers within DDR memory space restrictions and it is to this end that the disclosure is directed.

BRIEF DESCRIPTION OF THE DRAWINGS

FIG. 1 is a high level explanation of the CLOrID truncation process and the possible resulting hashing collisions within memory allocation;

FIG. 6 is a high level representation of a design for memory allocation that is implemented using a 256 Bytes memory allocation per Order Message and including the use of Bins and Off-Set Bins;

FIG. 7 is a representation of how memory space for new Orders would be allocated under the new claim via the use of the Bin Off-Set Pointer;

FIG. 8 is a high level explanation of the memory divisions and relationships under the new address mapping design.

DETAILED DESCRIPTION OF ONE OR MORE EMBODIMENTS

The disclosure is particularly applicable to a UPHC system and it is in this context that the disclosure will be described. It will be appreciated, however, that the system and method has greater utility since the embedded system may be implemented in other architectures or manners than those disclosed below. For example, the system and method described below may be used with other systems that suffer from hash collisions and the like. The system and method described in detail below, may assign orders (CLOrID) to memory so that hash collisions do not impact latency until the memory is more than 90% full. More generally, as now described with reference to FIG. 4A, the memory allocation and hashing method may be implemented on a data processor that may experience hashing collisions.

Figure 2:
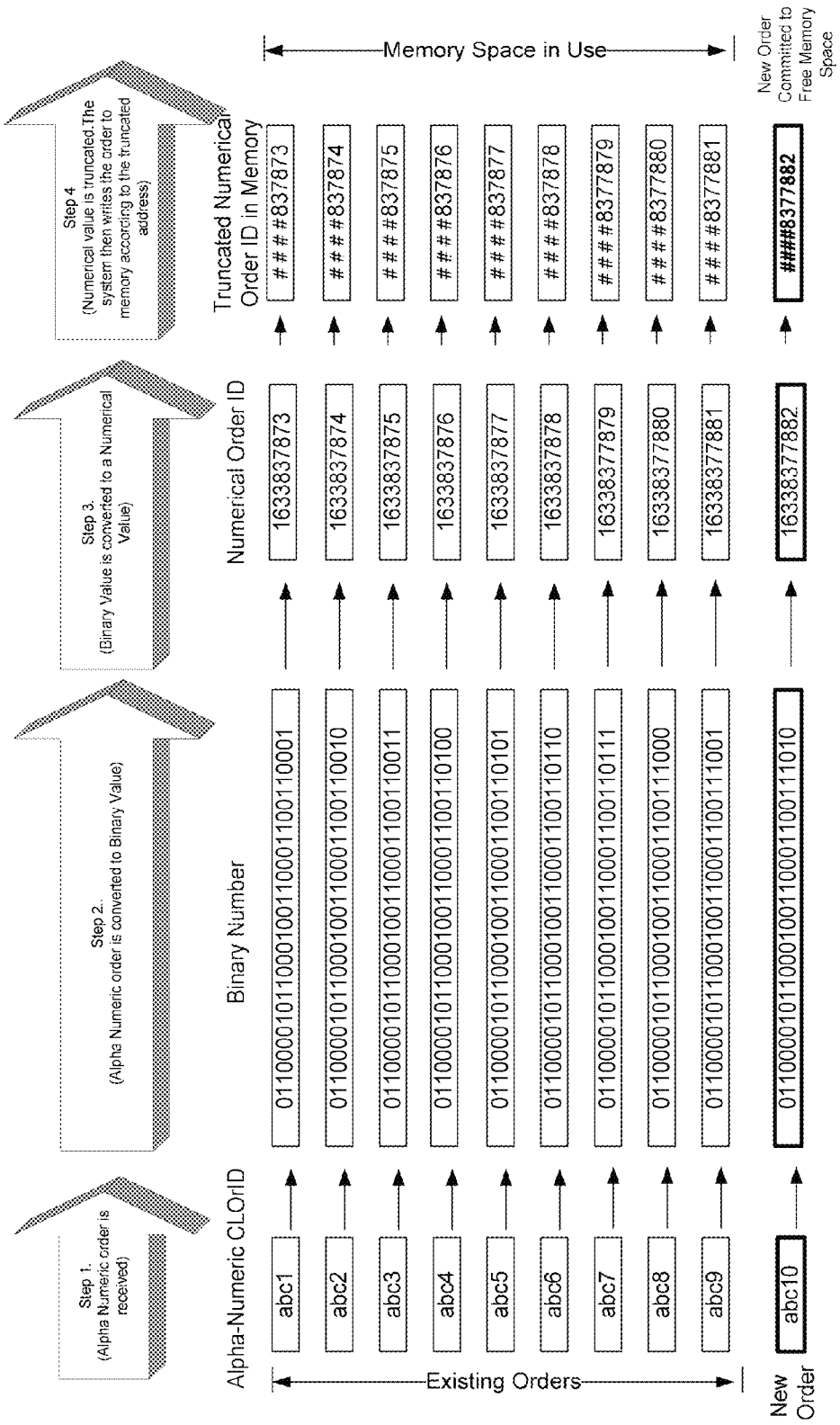
FIG. 2 is a high level explanation of the existing mechanisms for translating Alpha Numeric Order ID's (CLOrID) into numerical values which are then assigned to free memory space.
Figure 3:
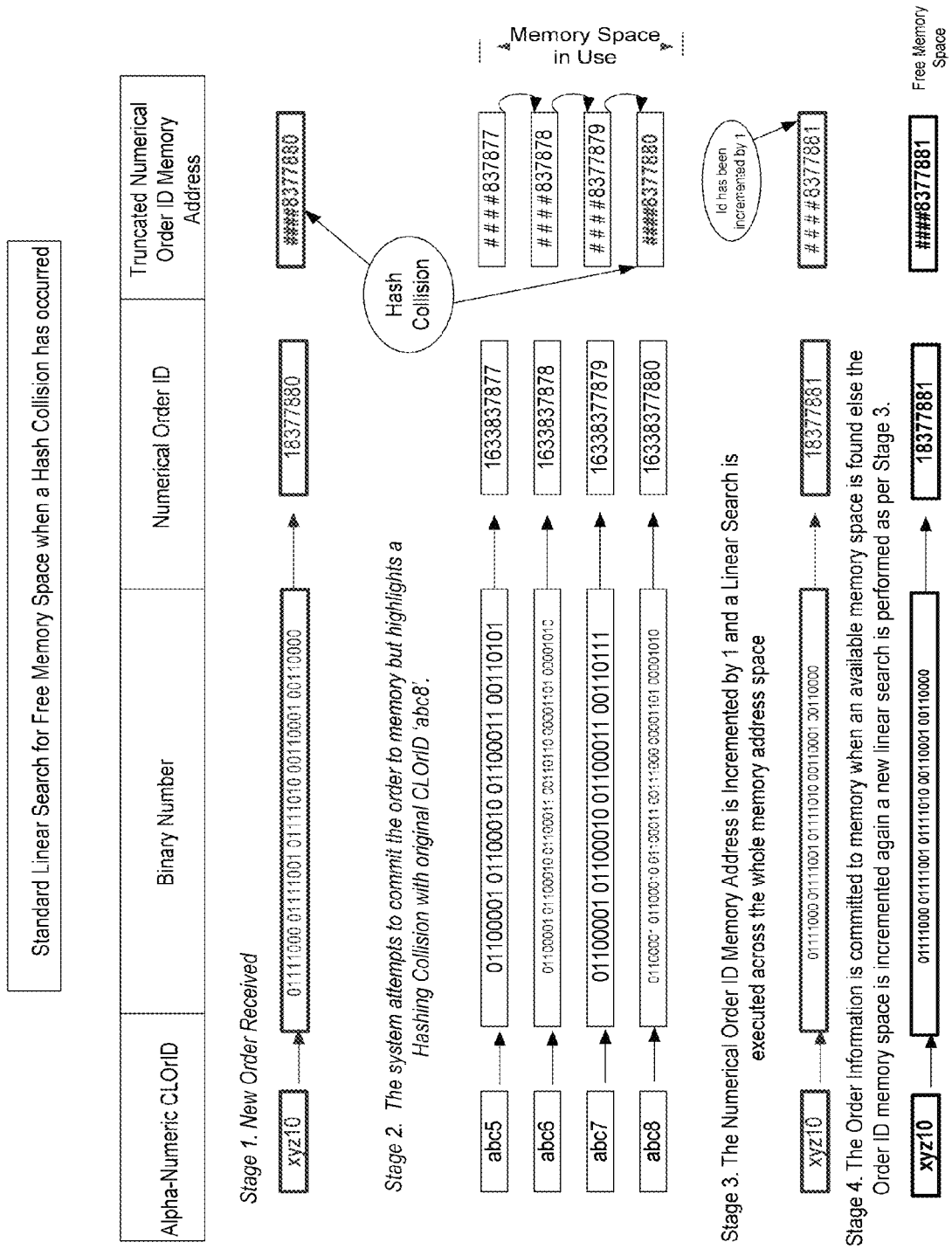
FIG. 3 is a high level explanation of a how a linear search is conducted after a hash collision has occurred within the UPHC memory space.
Figure 4A:
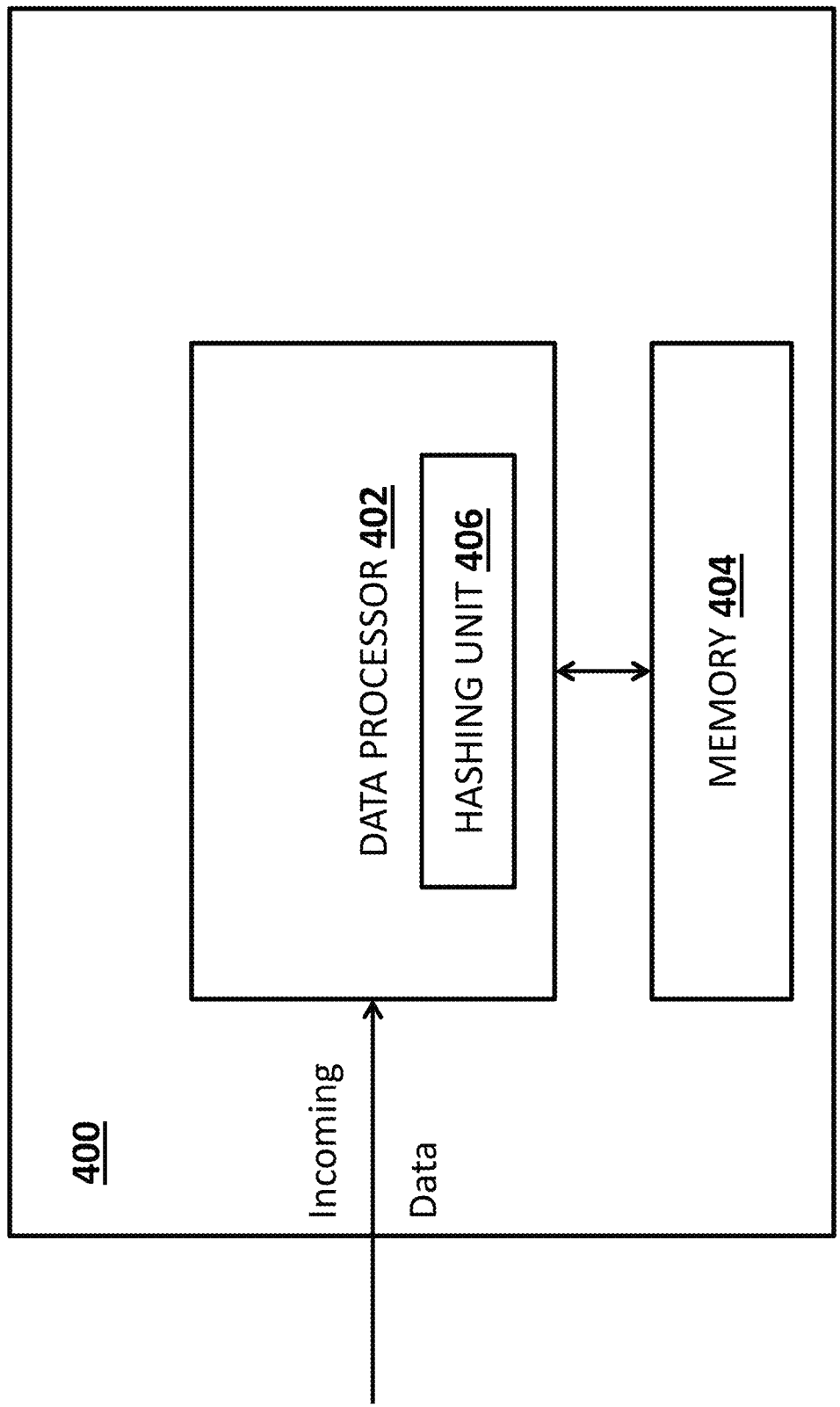
FIG. 4A illustrates an example of a data processor system that implements a memory allocation and hashing method with bins.

FIG. 4A illustrates an example of a data processor system 400 that implements a hashing method with bins. The data processor system 400 may be any system that can process data, such as an embedded computer system, a computer system and the like. The data processing system 400 may comprise a data processor 402, such as a microprocessor, microcontroller, embedded device with a processing core, etc. and a memory 404 coupled to the data processor 402 and the memory may store digital data and may, for example, be static or dynamic random access memory, flash memory, a persistent storage device and the like. The data processing system 400 may also have a hashing unit 406 that may be a hardware device or a plurality of lines of computer code that may be executed by the data processor 402. The hashing unit 406 hashes each identifier of the incoming data into the data processing system 400 so that the incoming data and/or the identifier of the incoming data may be stored in the memory 404. The hashing operation, as known, shortens the identifier into a hash code. However, as described above, the hashing and resulting truncation of the identifier may result in a hashing collision that require a linear search that impacts system speed. The hashing unit 406, however, implements a memory allocation technique and hashing using bins (both of which are described below in more detail) that reduces the impact of hashing collisions on the speed of the system. The method of memory allocation and hashing with bins is described in more detail below with reference to FIGS. 5A and 5B.

Figure 4B:
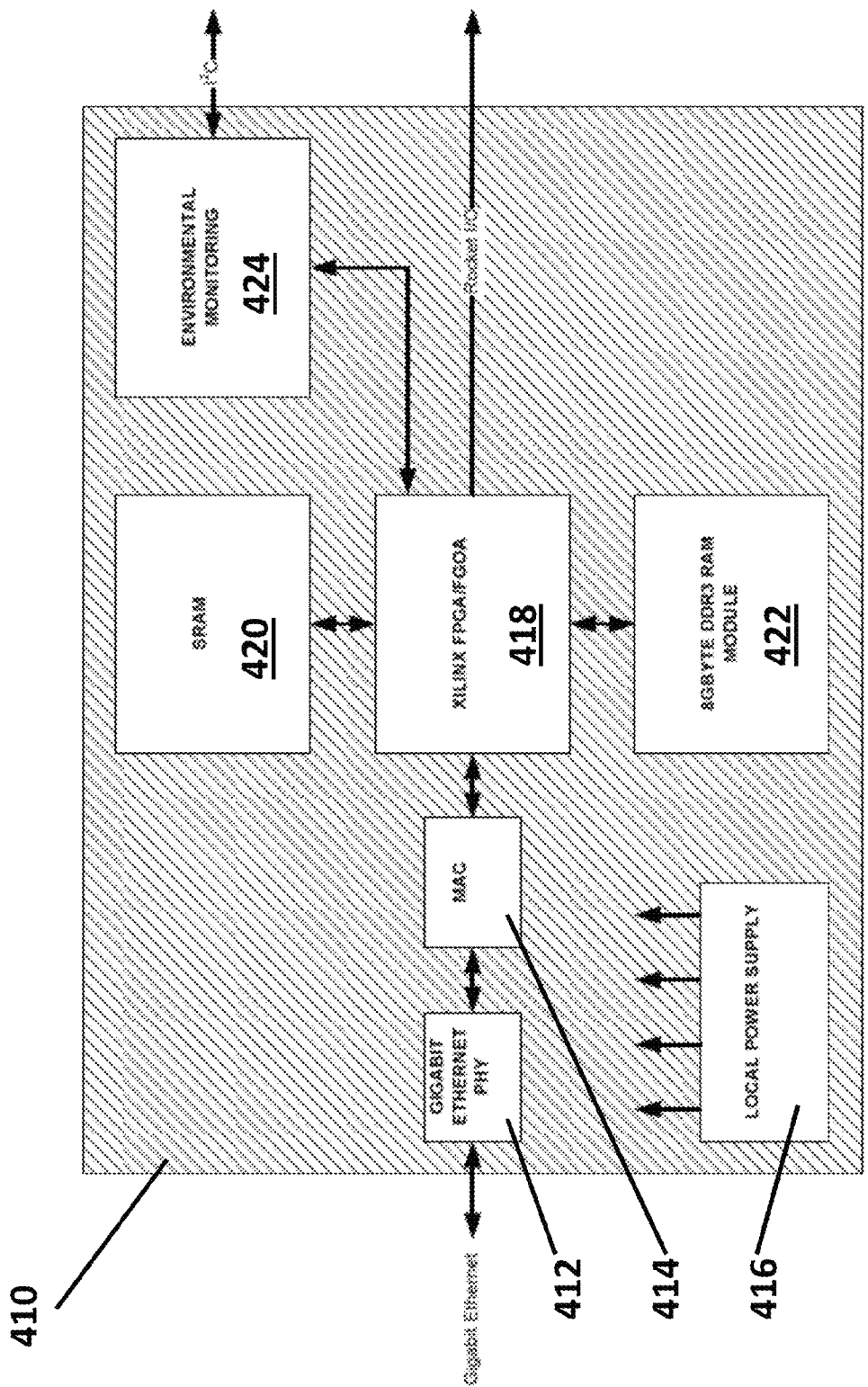
FIG. 4B illustrates an example of a User Programmable Hardware Chip used that may implement the memory allocation and hashing method with bins.

FIG. 4B illustrates an example of a User Programmable Hardware Chip (UPHC) 410 that may implement the hashing method with bins that is described in more detail with reference to FIGS. 5A and 5B. The UPHC 410 may be used for a risk assessment system and method that is described in co-pending patent application Ser. No. 13/298,280 filed on Nov. 16, 2011 and entitled "Embedded Hardware Based System Which Provides Real-Time Pre-Trade Risk Assessments For Multiple Parties And Method Thereof", now U.S. Pat. No. 8,655,767 issued on Feb. 18, 2014, which is incorporated herein by reference. The risk assessment system is a hardware based system and method that provides near real-time pre-trade risk assessments for multiple parties, in addition to near real-time market data and trading connectivity to a variety of liquidity venues comprising regulated exchanges, Electronic Communication Networks's (ECN's) and other financial institutions listing securities, options, futures, commodities, foreign exchange and other financial instruments. The risk assessment system is designed for use by financial market participants and their clients who seek to use near real-time market data streams to provide near real-time pre-trade risk assessments in order to trade a variety of financial instruments within multiple liquidity venues.

The UPHC 410 may have a physical layer (PHY) 412, such as a Gigabit Ethernet PHY, that is capable of connecting the UPHC 410 to a network, such as a Gigabit Ethernet link. The UPHC 410 may also have a media access controller (MAC) 414 connected to the PHY 412 that both communicate data to a data processor 418 in the UPHC. The UPHC 410 may also have a power supply 416 that powers the components and elements of the UPHC. The data processor 418 of the UPHC may be a field programmable gate array (FPGA) or a field programmable sea of gates (FGOA) that are programmed to process a particular type of data.

The UPHC may also have a static memory 420, such as SRAM for scratchpad and/or variable memory for the data processor 418 and a dynamic memory 422, such as DRAM, that provide a larger memory area for programs being executed or larger data or the storage of the data identifiers as described below in more detail. Both memories are coupled to the data processor 418. The UPHC may also have an environmental monitoring system 424 that is also coupled to the data processor. When implementing the memory allocation and hashing with bins method, the UPHC 410 may further comprise the hashing unit 406 that may be hardware or software being executed by the data processor 418. Both of the above data processing system are examples of systems that can implement the memory allocation and hashing with bins method and thus become memory allocation and hashing with bins systems.

Figure 5A:
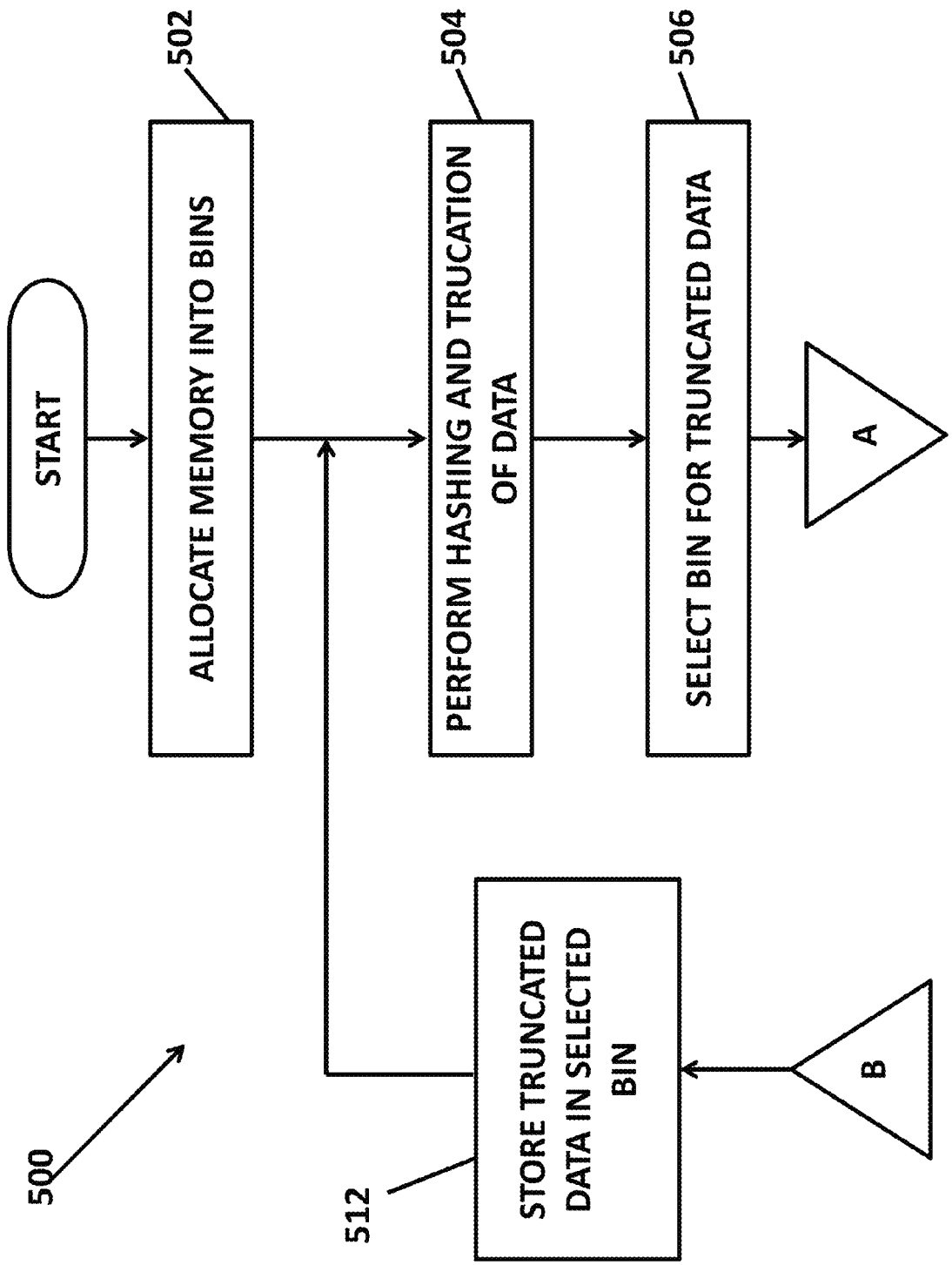
FIGS. 5A and 5B illustrate a method for memory allocation and hashing with bins.
Figure 5B:
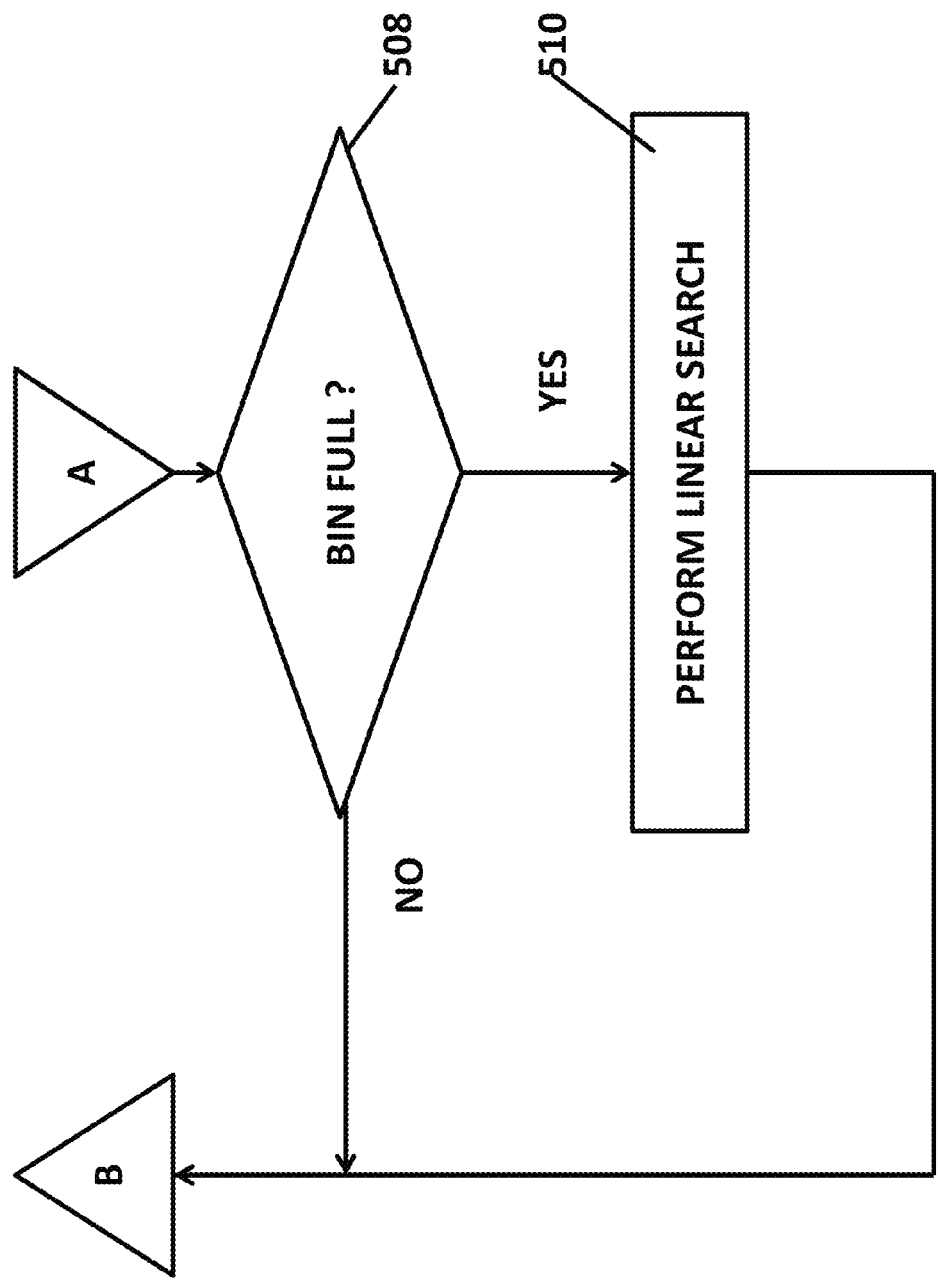

When the UPHC or data processor is being used as part of the risk assessment system, it may receive, hash and store a unique identifier, known as a Client Order Identifier (CLOrID), and it is this example that is used to describe the memory allocation and hashing method 500 with respect to FIGS. 5A and 5B. Furthermore, the UPHC or data processor may have a memory used to store the hashed and truncated CLOrIDs of 1 Gb although the memory allocation and hashing method may be used with various identifier memory spaces and the number of bins within each bin may be adjusted accordingly. In the method, the hashing unit may perform the one or more processes shown in FIGS. 5A and 5B. The hashing unit may be part of the data processing system, the data processor that is implementing the method and/or a separate hashing unit.

In the method when used in a risk assessment system, the order identifiers are going to be stored in the dynamic memory of the data processing system, but are first hashed and truncated as is known. A portion of the memory is thus allocated to the storage of those order identifiers. In the method, the hashing unit may then allocate that identifier memory portion into a plurality of bins (502) into which the hashed identifiers are stored.

Figure 6:
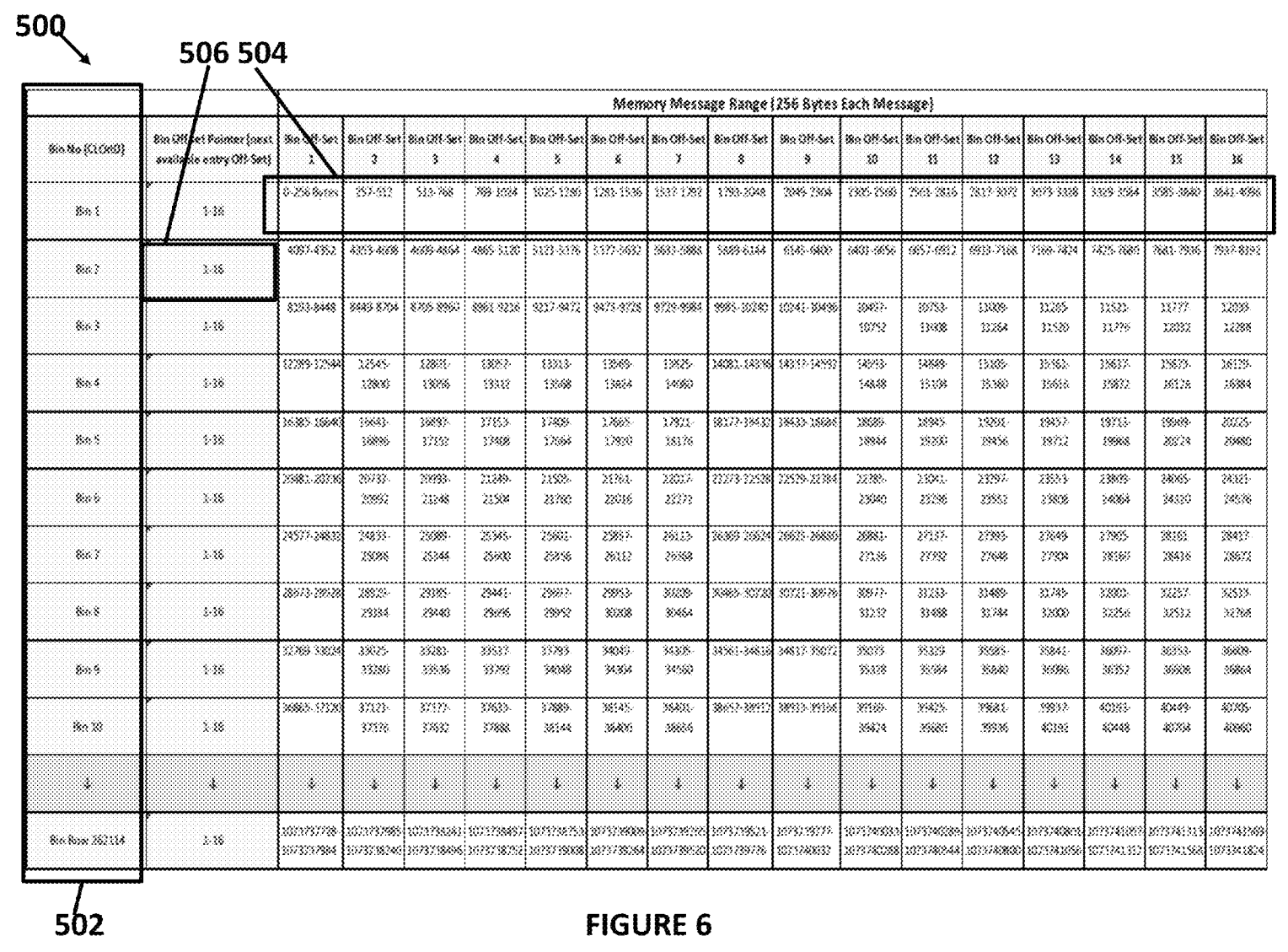
Figure 7:
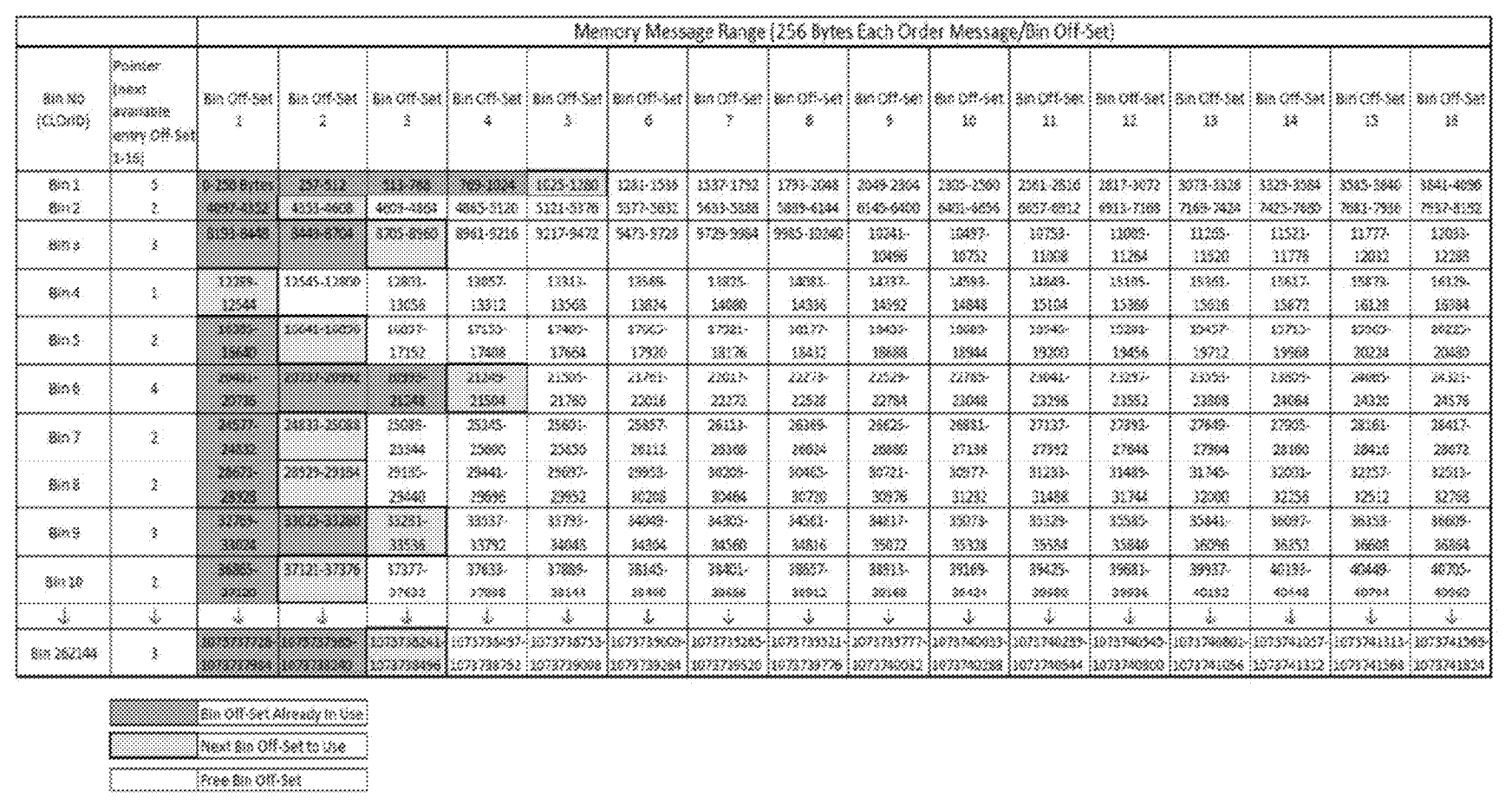

As shown in FIGS. 6-8, the memory portion for the identifiers may have an address space 500 (0-1073741824 in the example in FIG. 6) that is divided into a number of sections/memory locations (defined as "Bins") 502 that are smaller than the total memory space. Each bin in the memory portion may be mapped to the likely hashing/truncation algorithm outputs so that each bin is mapped to a predicted potential truncated identifier, such as the CLOrID in the case when the method is used with a risk assessment system. In a system with a 1 GB memory space, the identifier memory portion is divided into 4,194,304 memory locations each of 256 Bytes in which each 256 Bytes stores a truncated hashed identifier (a reduced identifier.) In the memory allocation and hashing with bins system that may have, for example, a 1 GB identifier memory space, the identifier memory space may be divided into 262,144 individual bins each of which is 4096 Bytes in size. Each bin contains a plurality of sub locations 504 ('Bin Off-Sets'), each of which is 256 Bytes (256 Bytes×16=4096 Bytes) as shown in the example implementation in FIG. 6. The relationship between each bin 502 and each set of bin off-sets 504 can be seen in FIG. 6. Specifically, each bin is assigned to a particular reduced identifier and then each bin off-set may be used to store an identifier that has been hashed and truncated to the same particular reduced identifier.

The system and method may also have a bin off-set pointer 506 for each bin (that appear in the second column in FIG. 6) that identifies a next open bin off-set for each bin. For example, when a bin for a reduced identifier of 111111 is empty, the pointer has a value of "1" meaning that the next reduced identified may be stored in a first bin off-set for that bin. When another identifier is hashed and truncated to the reduced identifier for the same bin, the pointer has a value of "2" and the next reduced identifier may be stored in bin off-set #2 and so on. In one implementation for the risk assessment in trading, the bins and the bin off-sets are flushed at the end of each trading day.

In the example of the 1 Gb memory, each bin may have sixteen bin off-sets and thus the pointer may have a value of 1 to 16. Thus, the bins and bin off-sets allow each bin to hold multiple identifiers that hashed and truncated to the same reduced identifier. In FIG. 6, the bins are listed (in Column 1) from 1 through to 262114 which covers the whole address space (i.e. 1 Gb÷4096 Bytes). Each Bin listed represents a specific predicted reduced identifier, such as the reduced CLOrID. The Bin Off-Sets are where the orders linked to a specific CLOrID will be stored (including both the first order received with that truncated address and also any associated hash collisions (duplicated reduced ID's). Column 2 in FIG. 6 lists the Bin Off-Set Pointer range (1-16), which explains that each Bin is also divided into 16 Bin Off-Sets. The Bin Off-Set pointer is used to identify a next free Bin Off-Set to be used for storing a new identifier, such as an order identifier. Columns 3-18 in FIG. 6 list the 16 Bin Off-Sets contained within each Bin and the actual memory space range that will be contained in each of them (256 Bytes per Bin Off-Set) for an exemplary implementation using a 1 Gb memory space.

Figure 9:
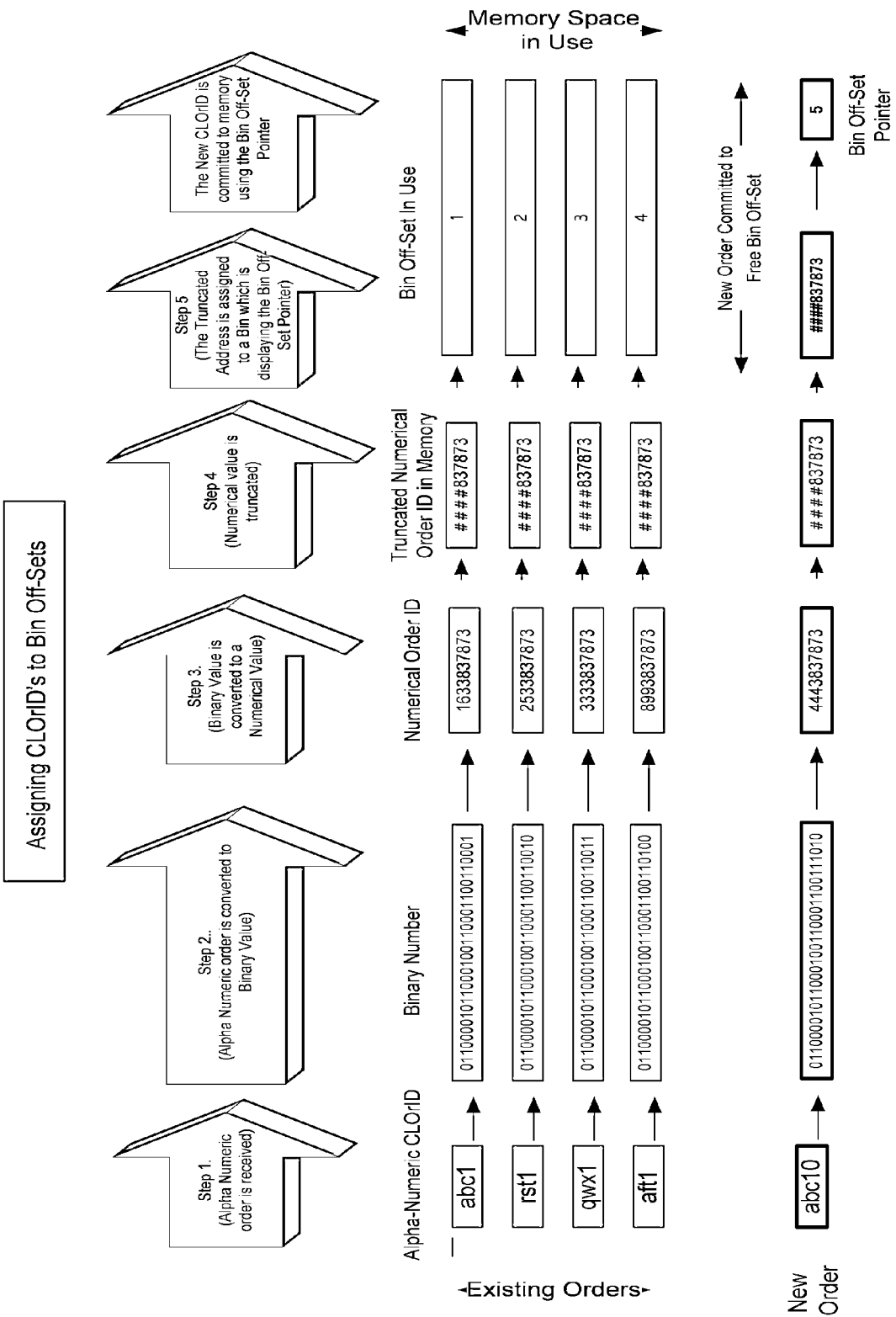
FIG. 9 is a high level representation of how a CLOrID would be committed to memory using the Bin Off-Set Pointer.

Once the identifier memory space has been allocated, the system may perform a known identifier hashing and truncation (504) process to generate a reduced identifier. Once the reduced identifier is generated, the system selects a bin into which the reduced identifier may be stored (506.) As shown in FIG. 9, the system and method selects an appropriate bin and bin offset based on the reduced ID for the identifier. In the method, the hashing unit utilizes the pointer that contains a next available (Unused) Bin Off-Set linked to a specific Bin. The pointer allows the system to be able to quickly identify a next bin off-set for a bin or determine that the particular bin in full (since the pointer contains a value, such as 16 in one example, indicating that all of the bin off-sets for the particular bins are full. The use of the pointer is shown in FIG. 7 for example.

In FIG. 7, the system has been storing identifiers so that the bin off-sets for certain bins already store a reduced identifier and the pointers point to potentially different bin off-sets for each bin. In FIG. 7, the memory address space map has been annotated so that free/available bin off-sets for each bin are unshaded (such as bin off-sets 6-16 for bin 1, bin off-sets 5-16 for bin 262144 and others as shown in FIG. 7), a next bin off-set to use for each bin is lightly shaded (such as bin off-set 5 for bin 1, bin off-set 3 for bin 262144 and others as shown in FIG. 7) and a bin off-set already in use is more darkly shaded (such as bin off-sets 1-4 for bin 1, bin off-sets 1-2 for bin 262144 and others as shown in FIG. 7.) In the memory space map in FIG. 7, bin 4 currently has a bin off-set pointer value of '1' to indicate that bin 4 has not yet received a reduced identifier linked to that address space. 'Bin 9' however has a bin off-set pointer value of 3 to indicate that that bin has already received 2 reduced identifiers with the same truncated ID value, i.e. Bin 9 has received an initial identifier, such as an order with that ID, and also a second order (resulting in a hash collision). In mapping the address space into bins 502 along with the multiple bin off-sets 504, such as 16 in one example, and through the use of the bin off-set pointer 506, the system maps a first reduced identifier (such as for a CLOrID when use in the risk assessment system) and then up to 15 additional reduced identifier with the same value (hash collisions in the typical system) into the memory. Unlike the typical system that must perform a linear search each time that a hash collision occurs, the system can store sixteen reduced identifiers (in the example in which sixteen bin offsets are used) without any need to perform the linear search.

Based on the pointer 506 described above, the hashing unit may determine, prior to storing the reduced identifier in the bin off-set for the bin, if the bin and the off-sets for the bin are (508 in FIG. 5B.) If the pointer 506 for the particular bin is less than a maximum value for the pointer, such as sixteen in the example shown in FIG. 7, then the bin is not full. If the bin is not full, then the reduced ID data is stored in a bin offset of the bin (512 in FIG. 5A) and the method is ready for the next identifier (CLOrID in one example) and loops back to process 504 in FIG. 5A. When the reduced identifier is stored in the bin off-set for the bin, the pointer for that bin may be incremented by one.

If the bin is full (as indicated by the pointer for the bin having a maximum value indicating that all of the bin off-sets are full), then the hashing unit may increment the reduced identifier by 1 and perform a linear search to find a new free Bin-Off-Set in the next Bin to store the reduced identifier (510 in FIG. 5B), identify a new bin and then store the reduced ID in the new bin (512 in FIG. 5A). As before, the pointer for the new bin is also incremented. The method is then ready for another identifier and loops back to process 504 in FIG. 5A. In the system described above, the bin off-sets store the hash collisions in a systematic way so that there is a greater chance that the linear search above will find a free address space more quickly than in prior systems. Consequently, even when a linear search does need to be executed, it will do so with less memory access penalty latency than under the existing method which will improve performance still further.

When the above memory allocation and bining method was used in a risk assessment system with a UPHC that had 1 Gb of SDRAM, it was observed that only after ~1,000,000 orders did any linear searching (between bins) impact latency. The result was a 200 times increase in order storage before latency was impacted. In comparison, the existing memory management method, latency was impacted after only ~5000 stored orders.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A data processing system, comprising:
a data processor;
a memory coupled to the data processor, the memory having a memory portion for storing memory identifiers, the memory portion having a plurality of bins wherein each bin is mapped to a unique reduced identifier that is an identifier that has been hashed and truncated, each bin having a plurality of bin offsets and each bin offset stores data about the unique reduced identifier associated with the bin wherein the bin offsets allow multiple identifiers to have the same reduced identifier;
a hashing unit, associated with the data processor, that selects a bin offset to store each reduced identifier wherein the bin offset is associated with a bin that is associated with the reduced identifier so that multiple identifiers having the same reduced identifier are stored in the memory.

2. The system of claim 1, wherein the memory has a pointer associated with each bin, wherein the pointer points to a next available bin offset for each bin, and wherein the hashing unit increments the pointer for a bin when a current reduced identifier is stored in the bin.

3. The system of claim 2, wherein the hashing unit stores a next reduced identifier for the bin into the bin offset pointed to by the incremented pointer and increments the pointer for the bin.

4. The system of claim 1, wherein the hashing unit performs a search when each of the bin offsets for a bin are filled for a selected bin and the search is not performed until all of the bin offsets for the bin are full.

5. The system of claim 1, wherein the hashing unit is incorporated into the data processor.

6. The system of claim 5, wherein the hashing unit is one of hardware and software.

7. The system of claim 1, wherein the hashing unit is separate from the data processor.

8. The system of claim 7, wherein the hashing unit is one of hardware and software.

9. The system of claim 1, wherein the data processor is a user programmable hardware chip.

10. The system of claim 9, wherein the user programmable hardware chip system is one of a field programmable gate array, a programmable object array and an application-specific integrated circuit.

11. The system of claim 9, wherein the user programmable hardware chip is part of a risk assessment system and the identifier is a client order identifier.

12. The system of claim 11, wherein the memory is 1 Gb in size.

13. The system of claim 12, wherein each bin has sixteen bin offsets and each bin offset is 256 bytes in size.

14. A method for memory management in a data processing system having a memory that stores identifiers, the method comprising:
allocating, in the memory, a plurality of bins wherein each bin is mapped to a unique reduced identifier that is an identifier that has been hashed and truncated, each bin having a plurality of bin offsets and each bin offset stores data about the unique reduced identifier associated with the bin wherein the bin offsets allow multiple identifiers to have the same reduced identifier;
selecting, by a hashing unit associated with the data processor, a bin offset to store each reduced identifier wherein the bin offset is associated with a bin that is associated with the reduced identifier so that multiple identifiers having the same reduced identifier are stored in the memory.

15. The method of claim 14 further comprising incrementing, by the hashing unit, a pointer for a bin when a current reduced identifier is stored in the bin and the pointer points to a next available bin offset for each bin.

16. The method of claim 14 further comprising storing the reduced identifier in the bin offset associated with the bin.

17. The method of claim 15 further comprising storing a next reduced identifier for the bin into the bin offset pointed to by the incremented pointer and incrementing the pointer for the bin.

18. The method of claim 14 further comprising performing, by the hashing unit, a search only when each of the bin offsets for a bin are filled for a selected bin.

19. A risk assessment system, comprising:
a user programmable hardware chip;
a memory coupled to the user programmable hardware chip, the memory having a memory portion for storing client order identifiers, the memory portion having a plurality of bins wherein each bin is mapped to a unique reduced client order identifier that is a client order identifier that has been hashed and truncated, each bin having a plurality of bin offsets and each bin offset stores data about the unique reduced client order identifier associated with the bin wherein the bin offsets allow multiple client order identifiers to have the same reduced client order identifier;

a hashing unit, associated with the data processor, that selects a bin offset to store each reduced client order identifier wherein the bin offset is associated with a bin that is associated with the reduced client order identifier so that multiple client order identifiers having the same reduced client order identifier are stored in the memory.

20. The system of claim 19, wherein the memory has a pointer associated with each bin, wherein the pointer points to a next available bin offset for each bin, and wherein the hashing unit increments the pointer for a bin when a current reduced client order identifier is stored in the bin.

21. The system of claim 20, wherein the hashing unit stores a next reduced client order identifier for the bin into the bin offset pointed to by the pointer and increments the pointer for the bin.

22. The system of claim 19, wherein the hashing unit performs a search when each of the bin offsets for a bin are filled for a selected bin and the search is not performed until all of the bin offsets for the bin are full.

23. The system of claim 19, wherein the hashing unit is incorporated into the data processor.

24. The system of claim 23, wherein the hashing unit is one of hardware and software.

25. The system of claim 19, wherein the hashing unit is separate from the data processor.

26. The system of claim 25, wherein the hashing unit is one of hardware and software.

27. The system of claim 19, wherein the user programmable hardware chip system is one of a field programmable gate array, a programmable object array and an application-specific integrated circuit.

28. The system of claim 26, wherein the memory is 1 Gb in size.

29. The system of claim 28, wherein each bin has sixteen bin offsets and each bin offset is 256 bytes in size.

30. A method for memory management for storing client order identifiers in a risk assessment system, the method comprising:

allocating, in the memory, a plurality of bins wherein each bin is mapped to a unique reduced client order identifier that is a client order identifier that has been hashed and truncated, each bin having a plurality of bin offsets and each bin offset stores data about the unique reduced client order identifier associated with the bin wherein the bin offsets allow multiple client order identifiers to have the same reduced client order identifier;

selecting, by a hashing unit, a bin offset to store each reduced client order identifier wherein the bin offset is associated with a bin that is associated with the reduced client order identifier so that multiple client order identifiers having the same reduced client order identifier are stored in the memory.

31. The method of claim 30 further comprising incrementing, by the hashing unit, a pointer for a bin when a current reduced client order identifier is stored in the bin and the pointer points to a next available bin offset for each bin.

32. The method of claim 30 further comprising storing the reduced client order identifier in the bin offset associated with the bin.

33. The method of claim 31 further comprising storing a next reduced client order identifier for the bin into the bin offset pointed to by the incremented pointer and incrementing the pointer for the bin.

34. The method of claim 30 further comprising performing, by the hashing unit, a search only when each of the bin offsets for a bin are filled for a selected bin.

* * * * *